United States Patent
Bruland

(10) Patent No.: US 7,712,629 B2
(45) Date of Patent: May 11, 2010

(54) DEVICE FOR MOVEMENT OF ARTICLES

(75) Inventor: Gorm Sverre Bruland, Asker (NO)

(73) Assignee: Tomra Systems ASA, Asker (NO)

( * ) Notice: Subject to any disclaimer, the term of this patent is extended or adjusted under 35 U.S.C. 154(b) by 479 days.

(21) Appl. No.: 11/575,550

(22) PCT Filed: Sep. 23, 2005

(86) PCT No.: PCT/NO2005/000350

§ 371 (c)(1),
(2), (4) Date: May 22, 2007

(87) PCT Pub. No.: WO2006/041302

PCT Pub. Date: Apr. 20, 2006

(65) Prior Publication Data

US 2007/0209458 A1    Sep. 13, 2007

(30) Foreign Application Priority Data

Sep. 24, 2004  (NO) ................................. 20044066

(51) Int. Cl.
*B65H 5/00* (2006.01)
(52) U.S. Cl. ........................ 221/234; 221/219; 221/273; 221/274; 221/293; 221/230; 198/358; 198/395; 177/25.18
(58) Field of Classification Search ................. 221/234, 221/219, 273, 274, 293, 230; 198/395, 358; 171/25.18
See application file for complete search history.

(56) References Cited

U.S. PATENT DOCUMENTS

| 2,192,503 | A | | 3/1940 | Newman |
| 3,796,544 | A | | 3/1974 | Zauft et al. |
| 4,454,961 | A | * | 6/1984 | Childers et al. ............. 221/266 |
| 4,705,125 | A | * | 11/1987 | Yamada et al. .............. 222/504 |
| 5,871,078 | A | | 2/1999 | Arnarson et al. |
| 5,924,546 | A | | 7/1999 | Funaya |
| 5,959,258 | A | * | 9/1999 | Howard ...................... 198/532 |
| 6,064,921 | A | | 5/2000 | Pippin et al. |

FOREIGN PATENT DOCUMENTS

JP    57153892 A    9/1982

* cited by examiner

*Primary Examiner*—Gene Crawford
*Assistant Examiner*—Timothy R Waggoner
(74) *Attorney, Agent, or Firm*—Rodman & Rodman

(57) ABSTRACT

A device for moving articles between positions at time intervals. The device includes at least two gates disposed sequentially in the direction of travel of the article which can controllably be opened and closed. Upstream of each gate there is formed a temporary holding area for the article. The two gates (1; 2; 3; 4) are controllable by means of one single drive motor (8) or actuator. The two gates (1; 2; 3; 4) are each associated with one control element (5; 6) rotatable about a respective axis of rotation, and the drive motor or actuator (8) is adapted to move one actuating element (7) that is rotatable about an axis of rotation and which is common to the respective control elements (5; 6) of the two gates.

16 Claims, 9 Drawing Sheets

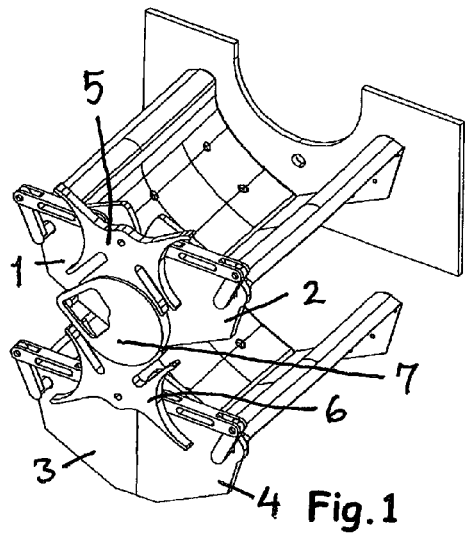
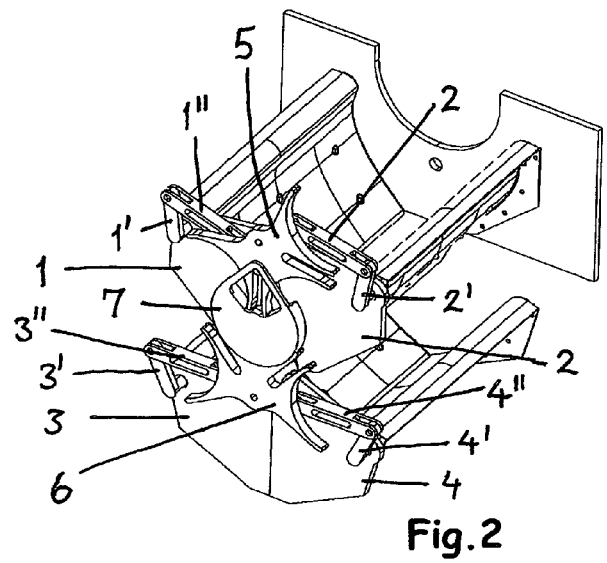
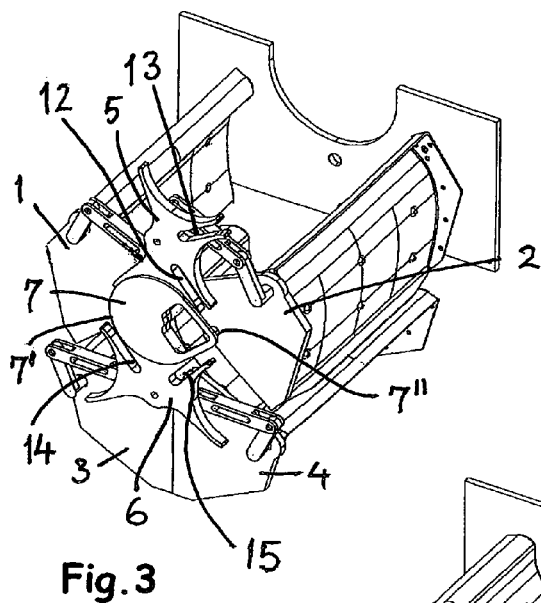
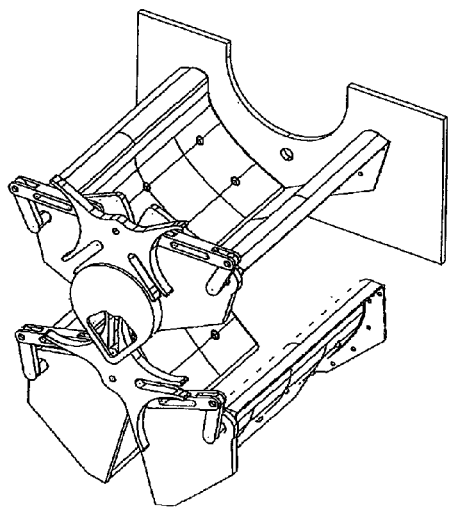
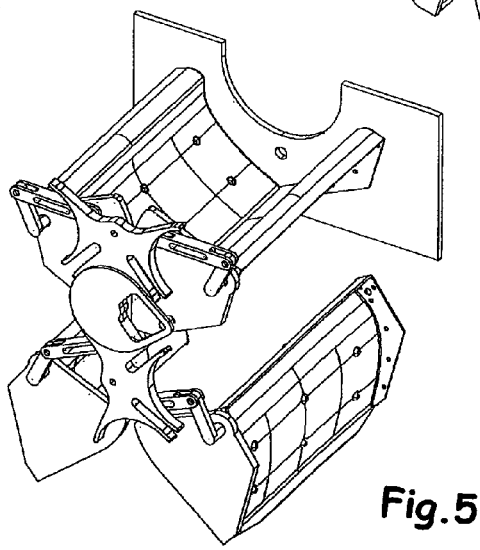

DEVICE FOR MOVEMENT OF ARTICLES

CROSS REFERENCE TO RELATED APPLICATIONS (Not Applicable)

STATEMENT REGARDING FEDERALLY SPONSORED RESEARCH OR DEVELOPMENT (Not Applicable)

NAMES OF THE PARTIES TO A JOINT RESEARCH AGREEMENT (Not Applicable)

INCORPORATION BY REFERENCE OF MATERIALS SUBMITTED ON A COMPACT DISC (Not Applicable)

BACKGROUND OF THE INVENTION (1) Field of the Invention

The present invention relates to a device for moving articles between positions at time intervals, wherein the device includes at least two gates disposed sequentially in the direction of travel of the article which can controllably be opened and closed, and wherein upstream of each gate there is formed a temporary holding area for the article.

A device of this kind is known in connection with the conveying of articles where it is desirable to have, inter alia, adequate separation of the articles, in that the articles are thus virtually sluiced through stages in a conveyor system. However, the known systems require mechanically complex solutions and the use of several actuating motors to get such a device to work in a satisfactory manner.

(2) Description of Related Art

As examples of previously known solutions, reference is made to U.S. Pat. Nos. 5,871,078 and 5,924,546.

One of the objects of the present invention is to find a practical feed solution for articles such as empty packaging, e.g. empty bottles, which are to be selectively fed into a conveyor system consisting of a continuous row of transport containers for conveying individual articles, as described in Norwegian Patent Application No. 20041032. In providing such a device, it has also been an object to reduce the number of drive motors or actuators to a minimum, and to ensure the drive gear is simple and reliable in operation.

BRIEF SUMMARY OF THE INVENTION (Not Applicable)

According to the invention, the device is characterised in that the two gates are controllable by means of one single common drive motor or actuator, that the two gates are each associated with one control element rotatable about a respective axis of rotation, and that the drive motor or actuator is adapted to move one actuating element that is rotatable about an axis of rotation and which is common to the respective control elements of the two gates, and that each control element has two or three curved recess portions that are angularly displaced from each other and where adjacent recess portions are separated by a guide groove, and that the actuating element has a curved portion designed for engagement with a recess portion on at least one of the two guide elements, and has an engaging pin adapted, in certain rotational positions of the actuating element, to engage with a guide groove on one of the control elements.

Further embodiments of the device according to the invention are set forth in the attached claims, and in the following description with reference to the attached drawing figures.

BRIEF DESCRIPTION OF THE DRAWINGS

FIGS. 1-5 show different stages in an operation of the device according to the invention.

DETAILED DESCRIPTION OF THE INVENTION

Figure 6:
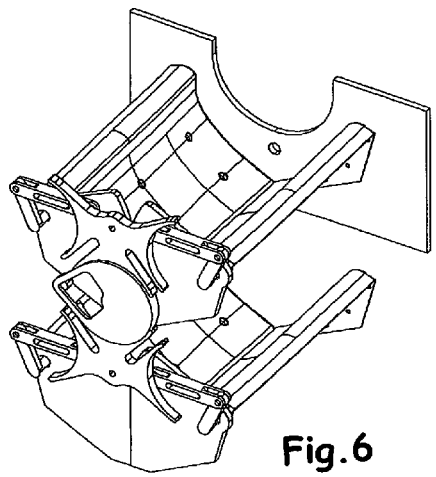
FIGS. 6-10 show different stages in an operation of the device where jamming situation arises in one of the gates.
Figure 7:
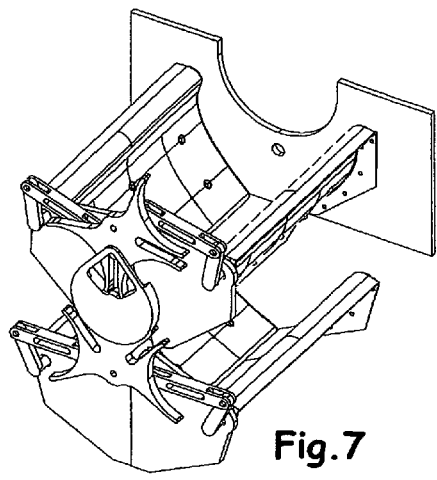

Although the illustrated solutions of the device are particularly suitable for moving an article by means of gravity, it will be understood that the device will also be suitable for the transport of articles on a conveyor, the gates in that case not having horizontal or tilted axes of rotation, but vertical axes of rotation.

The device as shown has a first gate 1, 2 and a second gate 3, 4. The gate 1, 2 is associated with one control element 5, and the gate 3, 4 is associated with one control element 6. The control elements 5, 6 are actuated by a single common actuating element 7 that is driven by a single motor 8 (see FIGS. 14 and 17). Thus, it will be understood that both gates can be operated by one common drive motor 8, which simplifies the operational control of the device.

Operation of the actuating element 7, in cooperation with the control elements 5, 6 is adapted, when seen in the desired direction of travel of an article 9, for example, a bottle, to cause the first gate 1, 2 to open from the closed state to the open state so as to allow the article to pass through this gate, to cause the second, subsequent gate 3, 4 to be kept closed until the article has passed through the first gate 1, 2 and the first gate is closed, to cause opening of the second gate 3, 4 so that the article can move through and away from it, and to cause closing of the second gate 3, 4 whilst the first gate 1, 2 is still kept closed.

In an alternative operation of the device, wherein the article 9 has such an extent or comes into such a position relative to the first gate that there may be a danger of the first gate 1, 2 jamming, i.e., that it does not manage to close, the following aspect of the operation of the actuating element emerges. The actuating element 7 in cooperation with the control elements 5, 6 causes the first gate 1, 2 to open from the closed state to the open state so as to allow the article to pass through the first gate. If the extent of the article in the longitudinal direction is greater than the length of the holding area upstream of the second gate, the first gate 1, 2 is caused to be kept still open whilst the second gate 3, 4 opens. After the article 9 has passed through both the first and the second gate and away from the second gate 3, 4, both the first and the second gate are caused to close.

Figure 11:
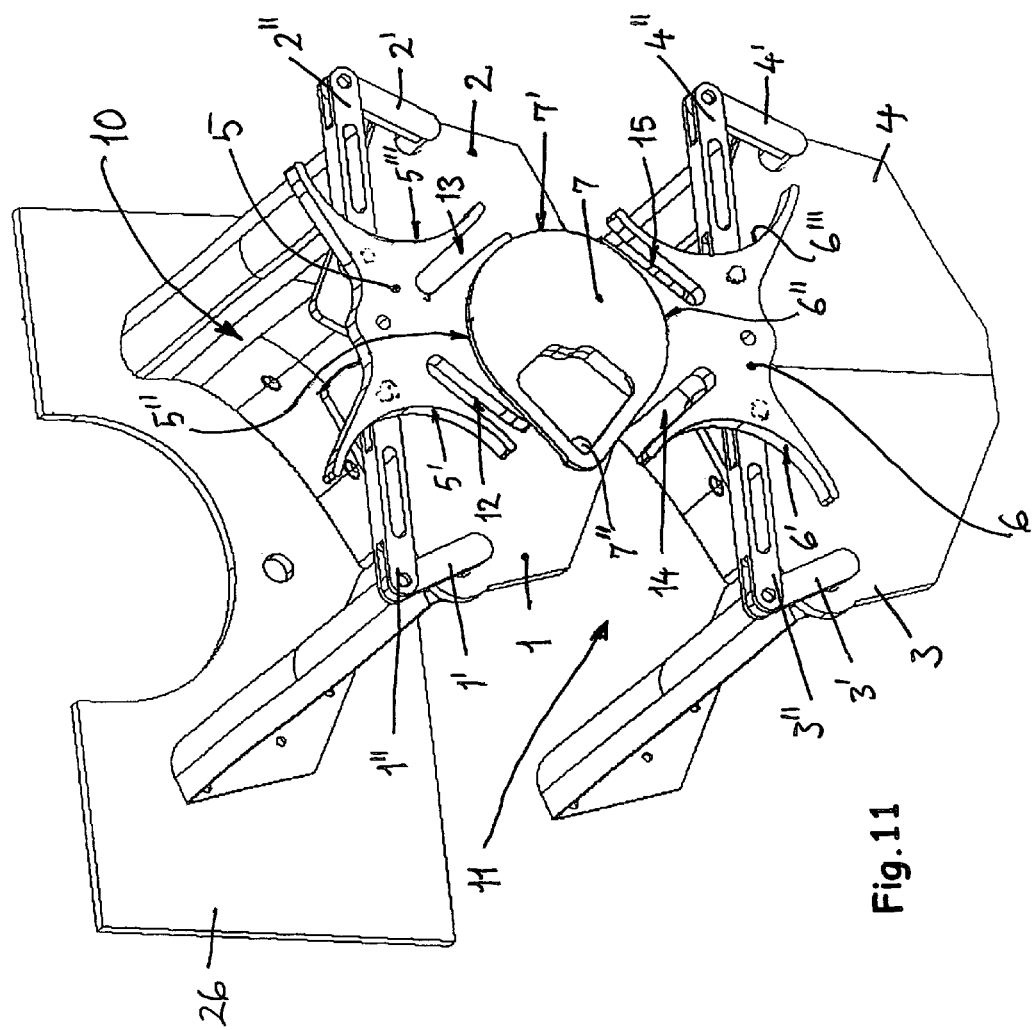
FIG. 11 is a highly magnified view of that shown in FIGS. 1 and 6.

Before operation cycles are described in more detail, reference is made to FIG. 11.

Each holding area 10, 11 has a gate 1, 2 and 3, 4 that is associated with a respective control element 5, 6 which has two or three curved recess portions 5', 5", 5''' and 6', 6", 6''' that are angularly displaced from one another at an angle in the range of 45°-90°. Adjacent recess portions 5', 5"; 5", 51'''; 6', 6"; 6", 6''' are separated by respective guide groove 12; 13; 14; 15. The actuating element 7 has a curved portion 7' designed for engagement with a recess portion 5'; 5"; 5'''; 6'; 6"; 6''' on at least one of the two control elements 5; 6, and a pin 7" adapted, in certain rotational positions of the actuating element 7, to engage with one of the guide grooves 12; 13; 14; 15 on one of the control elements 5; 6.

From FIG. 11 it will be seen that the curved portion 7' of the actuating element extends across an angular range of 180°-270°, and that the actuating disc has a circumferential form that is almost identical to a drop, the engaging pin 7" being located at the pointed end of the drop.

From a closer study of FIG. 11 it will be seen that the curved portion 7' of the actuating element 7 cooperates with one of said curved recesses 5'; 5"; 5'''; 6'; 6"; 6''' on control elements 5; 6, so that when these are in engagement, the control element 5; 6 is locked whilst the actuating element can rotate freely. Thus, the need for a locking mechanism on the actual drive motor 8 is obviated.

The guide pin 7" of the actuating element cooperates with the guide grooves of the control element 5; 6 so that when they are in engagement, the control element 5; 6 is rotated in the opposite direction of rotation by the actuating element 7.

The relationship between the guide pin 7" of the actuating element 7 and the guide groove 12; 13 and 14; 15 of the control element 5; 6 and the relationship between the curved portion 7' of the actuating element and the corresponding curved recess 5'; 5"; 5'''; 6'; 6"; 6''' of the control element 5; 6 are so designed that the position of the control element 5; 6 is always determined by the rotational position of the actuating element. The guide pin 7" of the actuating element 7 and the curved portion 7' of the actuating element 7 engage with the guide grooves and recesses of a control element in sequence, i.e., never simultaneously.

The guide pin 7" of the actuating element 7 engages with the control element 5 and the control element 6 in sequence, i.e. never simultaneously. This is because the actuating element has just one guide pin 7". When the guide pin 7" of the actuating element moves from control element 5 to control element 6 or vice versa, an intermediate state arises in which the guide pin 7" of the actuating element is not engaged. In this state, the curved portion 7' of the actuating element is in engagement with a recess on both the control element 5 and the control element 6, so that they are locked and cannot rotate.

The relationship between the guide pin 7" of the actuating element 7 and the guide grooves 5'-5'''; 6'-6''' of the control element 5; 6 is so designed that the rotational movement of each control element follows a sinusoid course, from start to stop, when the actuating element 7 rotates at a constant speed. Thus, it is only the motor's 8 own residual energy that is to be checked at the end positions of the actuating element 7. For this purpose, position sensors 16, 17 may be provided in connection with the actuating element. The motor 8 that drives the actuating element thus requires nothing more than simple control: <off>/<on> and a control system which cuts power to the motor if the system becomes locked at times other than when the actuating element is in one of its end positions.

The gates 1, 2 are articulatedly connected to the control element 5 via respective sets of pivoting arms 1', 1" and 2', 2", and similarly the gate parts 3, 4 are articulatedly connected to the control element 6 via respective pivoting arms 3', 3" and 4', 4". one end of the arms 1", 2", 3" and 4" is respectively rigidly connected to the gate parts 1, 2,3 and 4.

Aspects of the invention will now be described in connection with FIGS. 1-5. The actuating element 7 is, in a first rotational direction, adapted to move from a first rotational position to a second rotational position, and from there on to a third rotational position.

In the first rotational position, as shown in FIGS. 1 and 11, the actuating element 7, with its curved portion 7', engages with a first recess portion 5"; 6" on respectively a first 5 and a second 6 control element located in the direction of travel of an article 9, both gates 1, 2 and 3, 4 being closed.

In the second rotational position, as shown in FIG. 2, the actuating element 7, with its curved portion 7', engages with the recess portion 6" on the second control element 6 and, with the engaging pin 7", slidably engages with the guide groove 12 on the first control element 5. The guide groove 12 is adjacent to the recess portion 5" and the recess portion 5' on the first control element 5, whereby the first gate 1, 2 is caused to open, whilst the second gate 3, 4 is kept closed.

In the third rotational position, as shown in FIG. 3, the actuating element 7, with its curved portion 7', engages with the recess portion 6" on the second control element 6 and the recess portion 5' on the first control element, the first gate 1, 2 being open and the second gate 3, 4 in this rotational position being closed.

In a second, opposite rotational direction (in the illustrated example, the anticlockwise direction), the actuating element 7 is adapted to move from the third rotational position (FIG. 3) to the second rotational position (FIG. 2), whereby the first gate is closed, and then from the second rotational position (FIG. 2) to the first rotational position (FIG. 1) wherein both gates are closed.

The actuating element 7 is further adapted, on rotation in the second rotational direction (the anticlockwise direction) from the first rotational position (FIG. 1 ), to move to a fourth rotational position (FIG. 4), and from there on to a fifth rotational position (FIG. 5).

In the fourth rotational position (FIG. 4), the actuating element 7, with its curved portion 7', engages with the recess portion 5" on the first control element 5, and with the engaging pin 7" is in slidable engagement with the guide groove 14 on the second control element 6. The guide groove 14 is adjacent to the recess portions 6' and 6" on the second control element 6, and as shown in FIG. 4, the second gate 3, 4 is now opened whilst the first gate 1, 2 is kept closed.

In the fifth rotational position (FIG. 5), the actuating element 7, with its curved portion 7', engages with the recess portion 6' on the second control element 6 and the recess portion 5" on the first control element 5. The second gate 3, 4 is now fully open and the first gate 1, 2 is closed.

When the actuating element 7 then turns from the fifth rotational position (FIG. 5) in the first rotational direction (the clockwise direction) to the fourth rotational position, the second gate will be closed, and on further rotation from the fourth rotational position (FIG. 4) to the first rotational position (FIG. 1), both gates 1, 2; 3, 4 will be closed.

Here, it is worth noting that the gate 1, 2; 3, 4 will be kept closed (locked), even if it is bearing the load of an article 9, or if the gate is subjected to forces of another kind, for example, if someone tries to get past the gate manually by, e.g., trying to push something through it. The actuating element 7 that is controlled by one motor 8 thus facilitates this in cooperation with the control element 5 and/or the control element 6.

A situation in which there may be a possibility of jamming in the system, i.e., if an article 9 comes out of the first gate askew or has too large an axial length, may mean that the first gate 1, 2 will not close. This will now be explained in more detail in connection with that shown in FIGS. 6-10.

Figure 8:
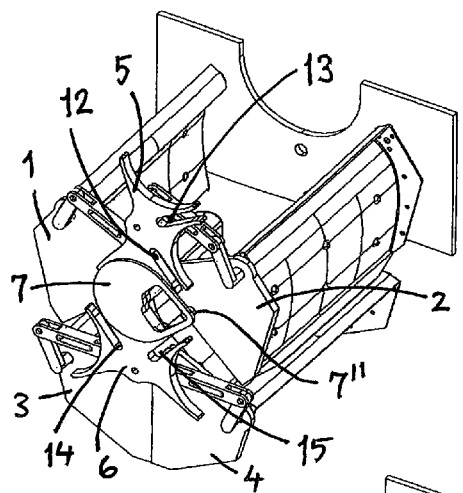
Figure 9:
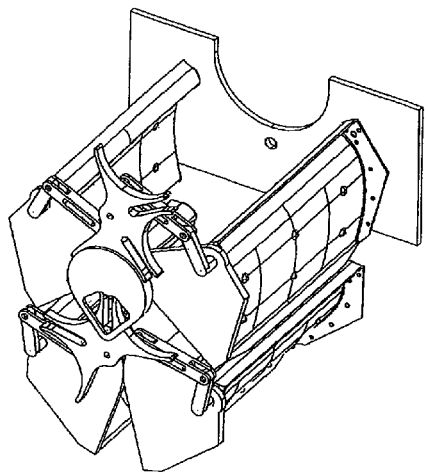
Figure 10:
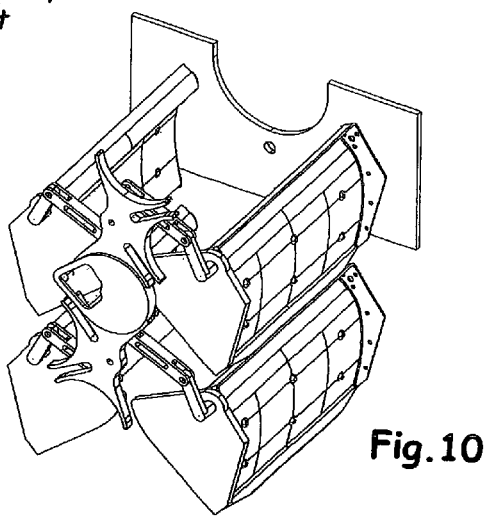

The actuating element 7 will in the first rotational direction (the clockwise direction) move from a third rotational position as shown in FIG. 3 and FIG. 8 on to a fourth rotational position as shown in FIG. 9, and from there on in the clockwise direction to a fifth rotational position as shown in FIG. 10. It will be seen that the fifth rotational position for the actuating element 7 is the same as the position the actuating element had in the first rotational position (FIG. 6).

In the fourth rotational position (FIG. 9), the actuating element 7, with its curved portion 7', engages with the recess portion 5' on the first control element 5 and via the pin 7" slidably engages with the guide groove 15 on the second control element 6. This guide groove 15 is adjacent to the recess portions 6", 6'" on the second control element, whereby the first gate 1, 2 is kept open, whilst the second gate 3, 4 is caused to open.

In the fifth rotational position (FIG. 10), the actuating element 7, with its curved portion 7', will engage with the recess portion 5' on the first control element and the recess portion 6'" on the second control element 6. In this case, it can be seen that both the first gate and the second gate are open, so that an article 9 can be discharged via the gate 3, 4 in that jamming is eliminated since the gate 1, 2 is caused to be kept open. Thus, it will be understood that in the situation where the gates 1 and 2 must be opened so that, e.g., an excessively large article can be discharged, and after the gates 3 and 4 have been opened, the actuating element 7 will rotate from the position shown in FIG. 5 to the position shown in FIG. 10.

Figure 13:
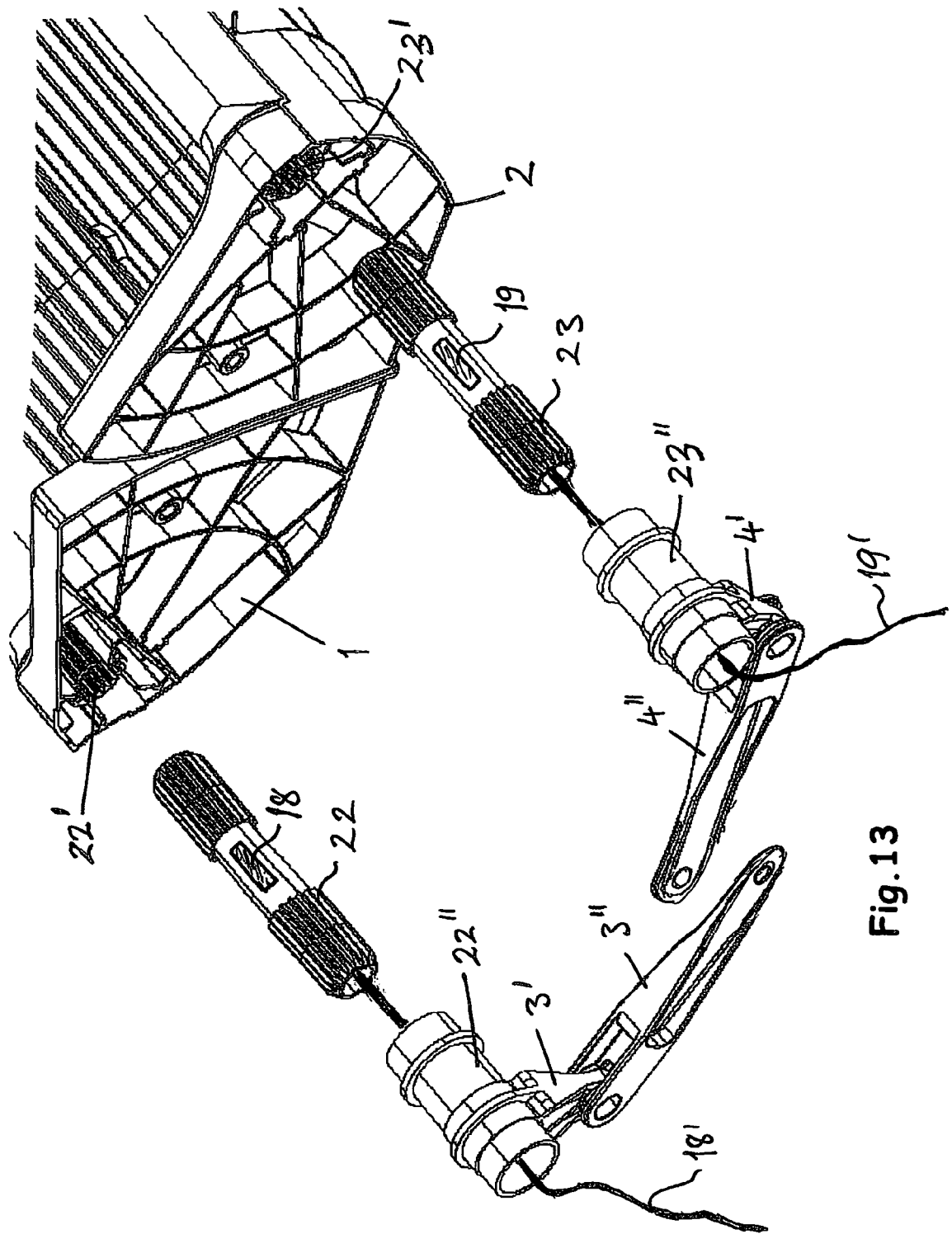
FIG. 13 is an exploded view of a section of one gate with control element and actuating element.
Figure 17:
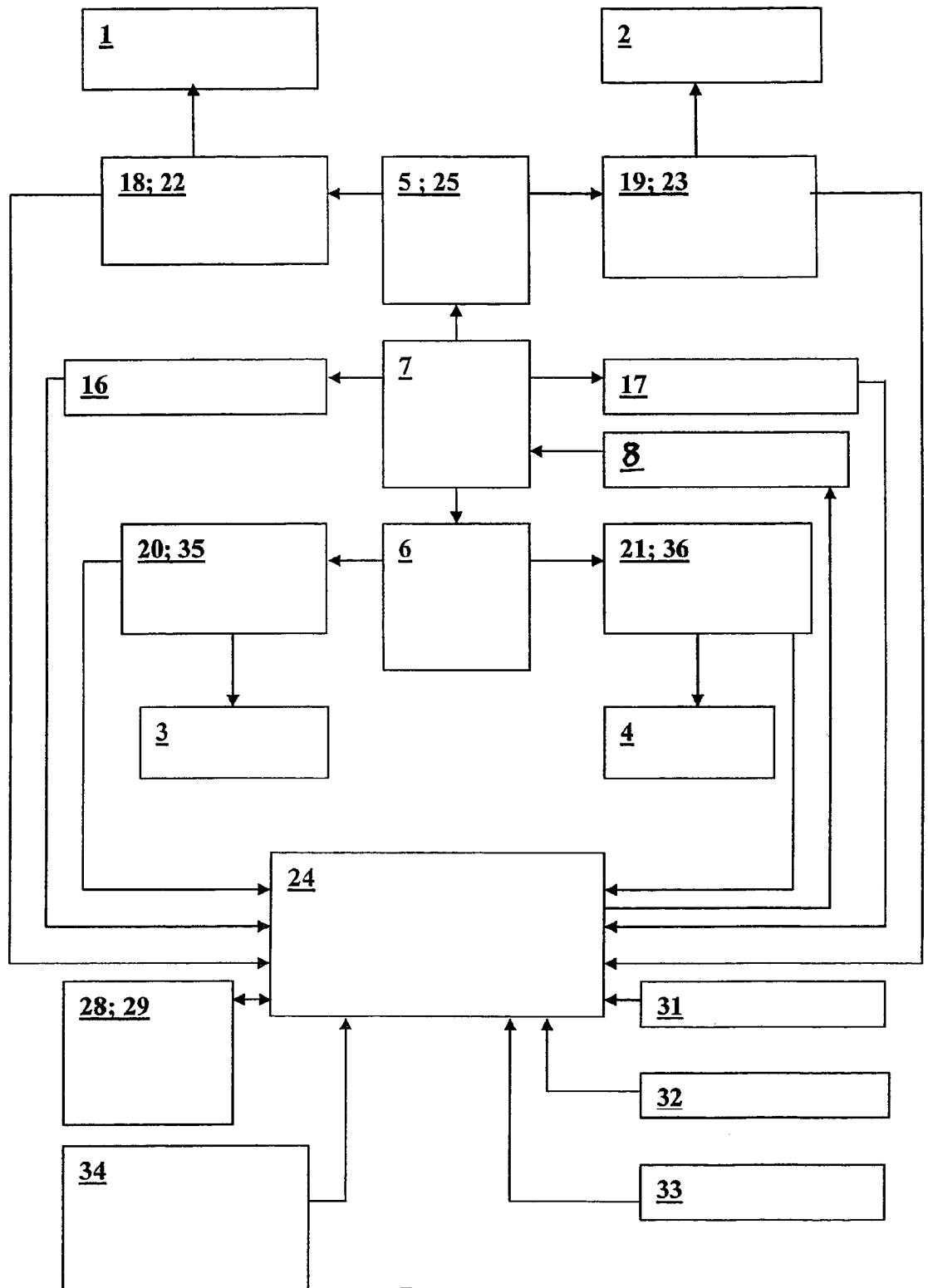
FIG. 17 is a block diagram of the possible elements which may be incorporated in the device, and in cooperation with elements in a reverse vending machine.

In connection with the detection of articles that are stuck between the gates so that downstream movement of the article is prevented, there are in reality two possible wedging or jamming states. In a first state, the diameter of the article 9, when squeezed, causes the actuating element to be made to rotate to an end position. This state is detected by torsion sensors 18, 19; 20, 21 which are advantageously mounted on the drive shafts of the gates 1, 2; 3, 4; see FIG. 13. FIG. 13 shows only the torsion sensors 18, 19 in connection with the drive shafts 22, 23. As indicated, cable 18', 19'; 20', 21' (see also FIG. 17) can connect the torsion sensors to a process control unit 24 (FIG. 17). The unit 24 controls the motor 8. In a second state, the diameter of the article 9, when squeezed, will not allow the actuating element to reach its end position. The state is detected by the absence of signals from end position sensor 16, 17 and read-off torsion from the sensors 18, 19, optionally also the sensors 20, 21.

When this complicating article 9 that has caused a jammed state, especially in the first gate, has left the device via the second gate 3, 4 without being prevented by the first gate 1, 2, the actuating element 7 is adapted to rotate in the second, opposite rotational direction (the anti-clockwise direction) successively from the fifth rotational position (FIG. 10) to the fourth rotational position (FIG. 9), from the fourth rotational position to the third rotational position (FIG. 8), from the third rotational position to the second rotational position (FIG. 7), and from the second rotational position to the first rotational position (FIG. 6).

As shown in the drawings, each gate 1, 2; 3, 4 consists of two parts that are movable in relation to each other. Initially and as shown, the two parts will be provided with a rotational movement, but in a modification it is conceivable that one of the parts is stationary and the other part is movable. Thus, it is important that at least one of these parts is rotatably mounted on a base member 26, and the control elements for respectively the first gate and the second gate are via the said linkages adapted to actuatably cause rotational movement of at least one gate part of the respective gate for the opening or closing of this gate.

As shown in the drawing figures, each gate is designed to form a chamber or tray, and the chamber or tray forms the said article holding area of the respective gate. If the gates do not have a horizontal axis of rotation, but a vertical axis of rotation, it will not be absolutely necessary to make the gate parts as shown, as they could then possibly have a straight instead of a curved cross-section. In such a case, it is conceivable that the gate parts, when seen from above, could form an angle in relation to each other, so that the article when carried by a conveyor would be guided towards the point at which such a gate would first open, i.e., in the present case at the point at which the respective two parts of the gates 1, 2 and 3, 4 move apart. This solution with an upright axis of rotation for each gate is particularly suitable if the device is not intended to be used for moving the article by gravity, but by using said conveyor. In this case, the upstream area of the conveyor associated with each gate will define the article holding area of the respective gate.

An alternative, industrial embodiment of a gate solution for the first of the gates is shown in FIG. 13. The gate parts 1, 2 in this case are connected via drive shaft mounts 22', 23' to respective drive shafts 22, 23. In connection with the pivoting arms 1', 2' (and similarly for the second, non-illustrated gate) there are provided drive shaft sleeves 22" and 23" for mounting the drive shafts 22, 23. The drive shafts will normally be of such nature that when subjected to torsional strain they will be able to twist slightly, at least to such extent that torsion is measurable by the torsion sensors 18, 19. In FIG. 17 the drive shafts belonging to the gate 3, 4 are indicated by the reference numerals 35, 36. These drive shafts correspond to the drive shafts 22, 23 with associated torsion sensors, mounts and sleeves.

Figure 12:
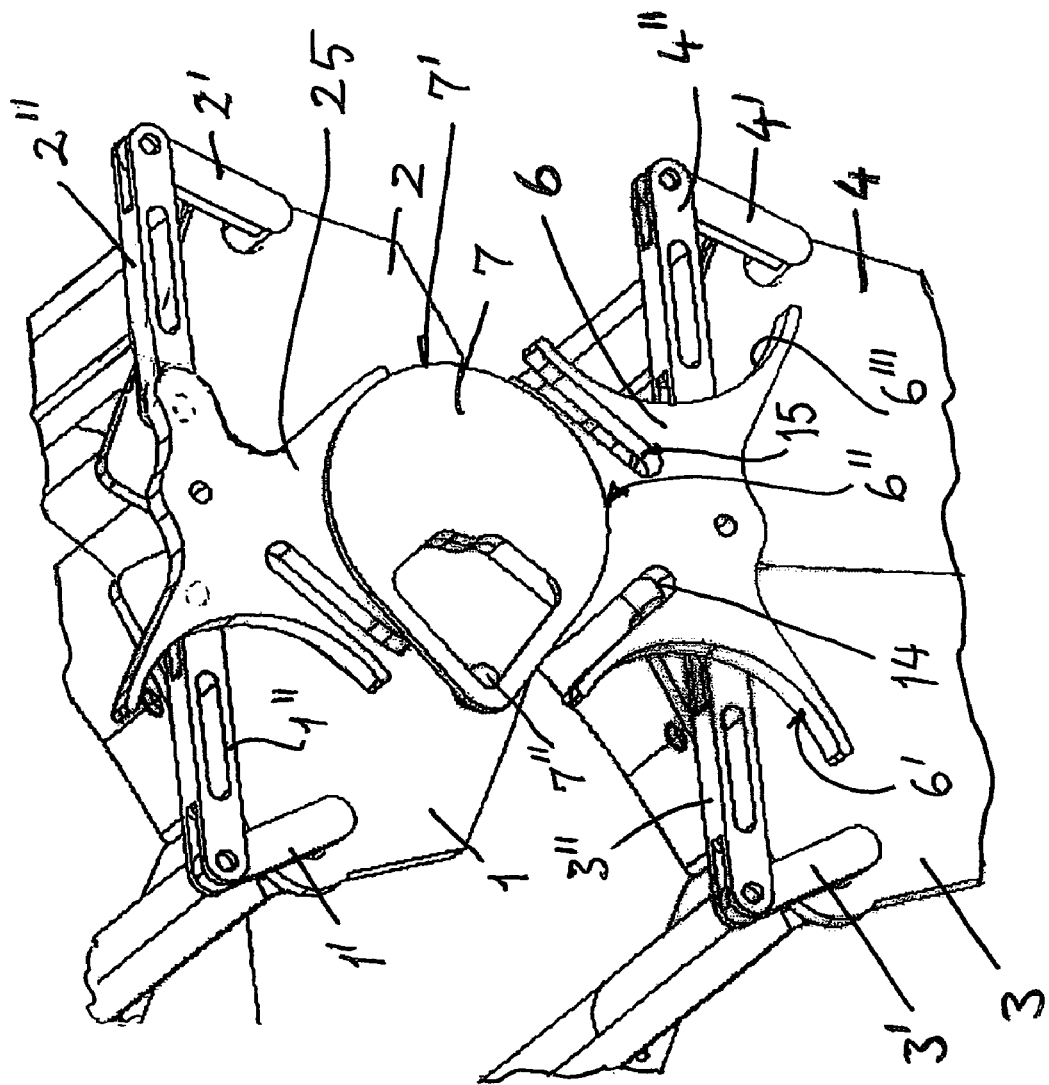
FIG. 12 shows a section of FIG. 11 with a modified actuating disc.

It will be seen that the control element 5, as shown in the preceding figures, has in connection with FIG. 12 been given a somewhat simplified form, and the control element is therefore indicated by the reference numeral 25 in this figure. The portions of the control element which under normal operation are strictly speaking not necessary, have been omitted in this figure. FIG. 12, which shows a section of FIG. 11, shows how it is possible to modify the control element 5 to have an appearance as indicated by reference numeral 25, and in cooperation with the actuating element 7. However, this is not an essential aspect of the invention. In a preferred embodiment, the control is elements 5 and 6 advantageously will have the same design, or have a design which gives the same functional possibilities.

Figure 14:
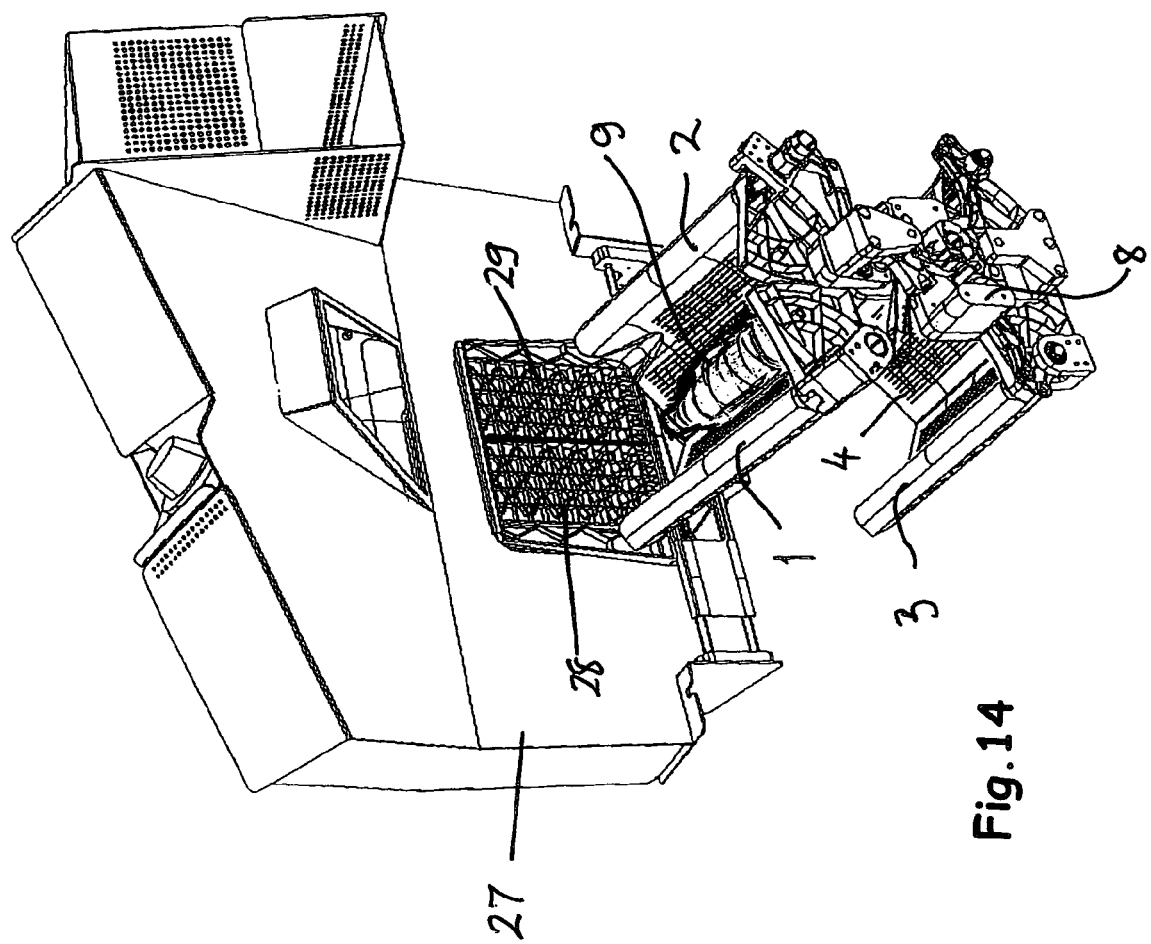
FIG. 14 is a perspective view of a practical implementation of the device in connection with a reverse vending machine.

In connection with a reverse vending machine 27 in which the device has been incorporated, it will be expedient, as shown in FIG. 14, to provide an access gate to the device, where the access gate, e.g., has two laterally movable gate parts 28, 29 that are controlled from the process control unit 24.

In the reverse vending machine 27, in an infeed chamber 30 upstream of the gate 28, 29, there could be a detector 31 for recognising whether an article contains metal or consists of metal. In such a case, the reverse vending machine will, depending on the detection result, determine how such an article is to be further handled.

Furthermore, in the infeed chamber 30 it will be expedient to install a means 32 for material recognition, such as the recognition of plastics material. This is particularly useful in connection with receiving empty packaging, as for instance empty beverage containers, where it is important to sort the plastics materials and their colour, if any, in a best possible way for recycling or reuse.

In addition, the use of a video camera 33 would be expedient both for possibly recognising the contour of an article, bar code or other identification thereon, and for ensuring that just one article at a time moves into the device towards the first gate and is passed on from there before the next article is admitted into the device. The video camera 33 is expediently located in the infeed chamber 30 in the reverse vending machine 27, but it is also possible that the video camera could have a detection field that is directed towards the holding area immediately upstream of the first gate 1, 2.

If one article is located simultaneously in both the holding area upstream of the first gate and the holding area upstream of the second gate, such presence, as indicated, will be detectable using the torsion sensors 18, 19. In such a case, the sensor will cause the further rotation of the actuating element 5 from the third rotational position to the fourth rotational position and from there on to the fifth rotational position, as explained above.

A second and important aspect related to the torsion sensors 18, 19; 20, 21 is that these effectively will act to measure the weight of an article. In a number of cases, an empty bottle, for example, may be covered in a plastic material in the form of shrinkable plastic film, and the actual bottle decoration thus emerges via this plastics material. In that case, there is a risk that the plastics material detector 32 will only detect the presence of a certain plastics material and not register that there is a glass material within. In this respect, cooperation between the torsion sensors, especially the sensors 18, 19 which then function as weighing instruments, and the camera 32 will lead to the unit 24 determining that the article, on the basis of its weight and size, but where only the plastics material thereof has been detected, must also contain another considerably heavier material such as glass. This is an aspect of the invention which of course is important for further sorting.

A safety aspect that is related to the closing of the gate parts 1, 2 and 3, 4 is the fact that the closing takes place with a powerful clamping effect. If an article in error remains in the opening between two such gate parts when these are to be made to move towards each other to close the gate, a steadily increasing clamping force that is provided by he motor 8 via the actuating element 7 and respective control elements 5; 6 will be detected by the torsion sensors 18, 19; 20, 21 and cause the motor 8 to be moved so that the gate parts, which exert clamping force against an article, move apart, or that the motor 8 is stopped. It will be understood that this clamping force threshold is easily adjustable by setting detection parameters in the process control unit 24. In reality, this could function as any other known clamping prevention.

Figure 15:
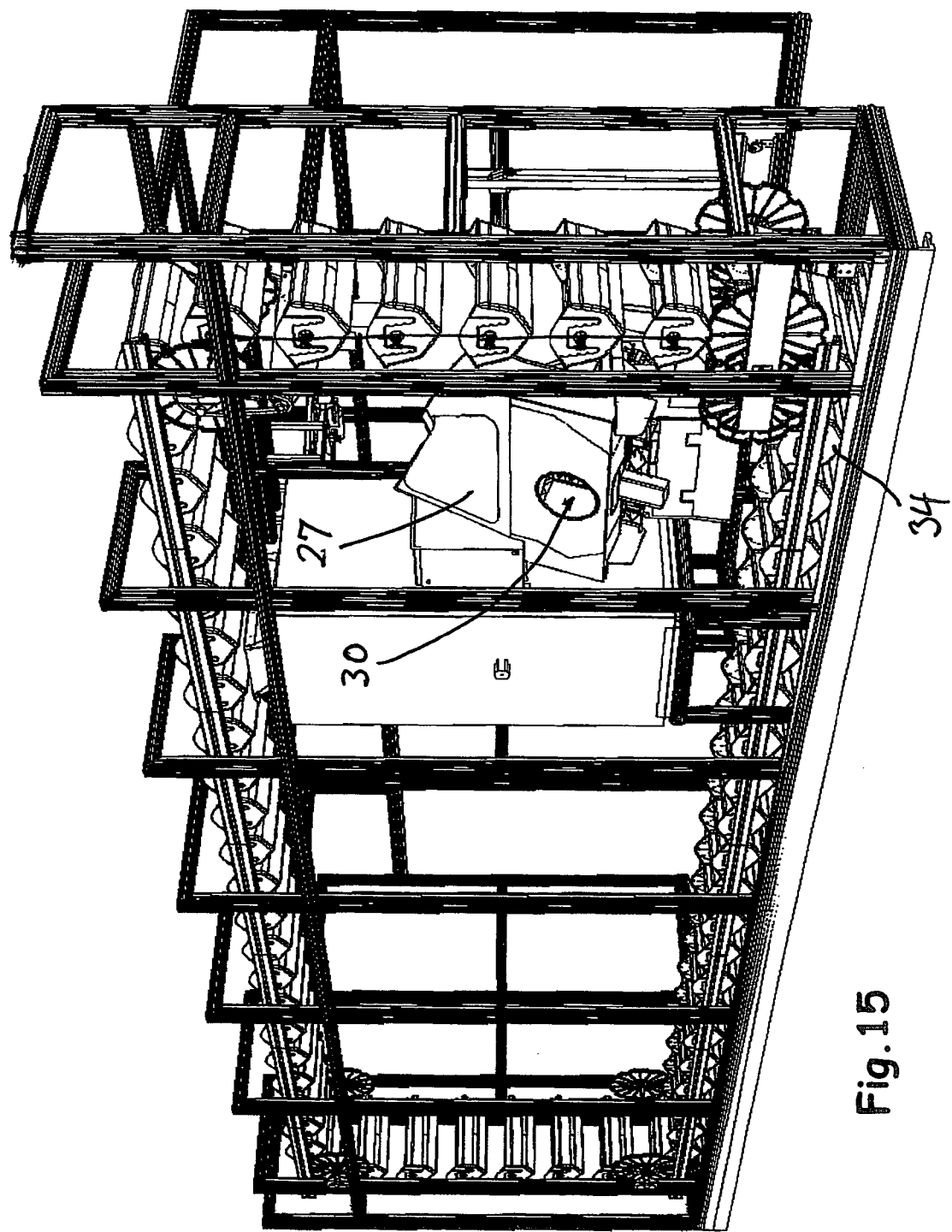
FIG. 15 is a perspective view of the device in FIG. 14 together with the reverse vending machine and used in a system with transport containers.
Figure 16:
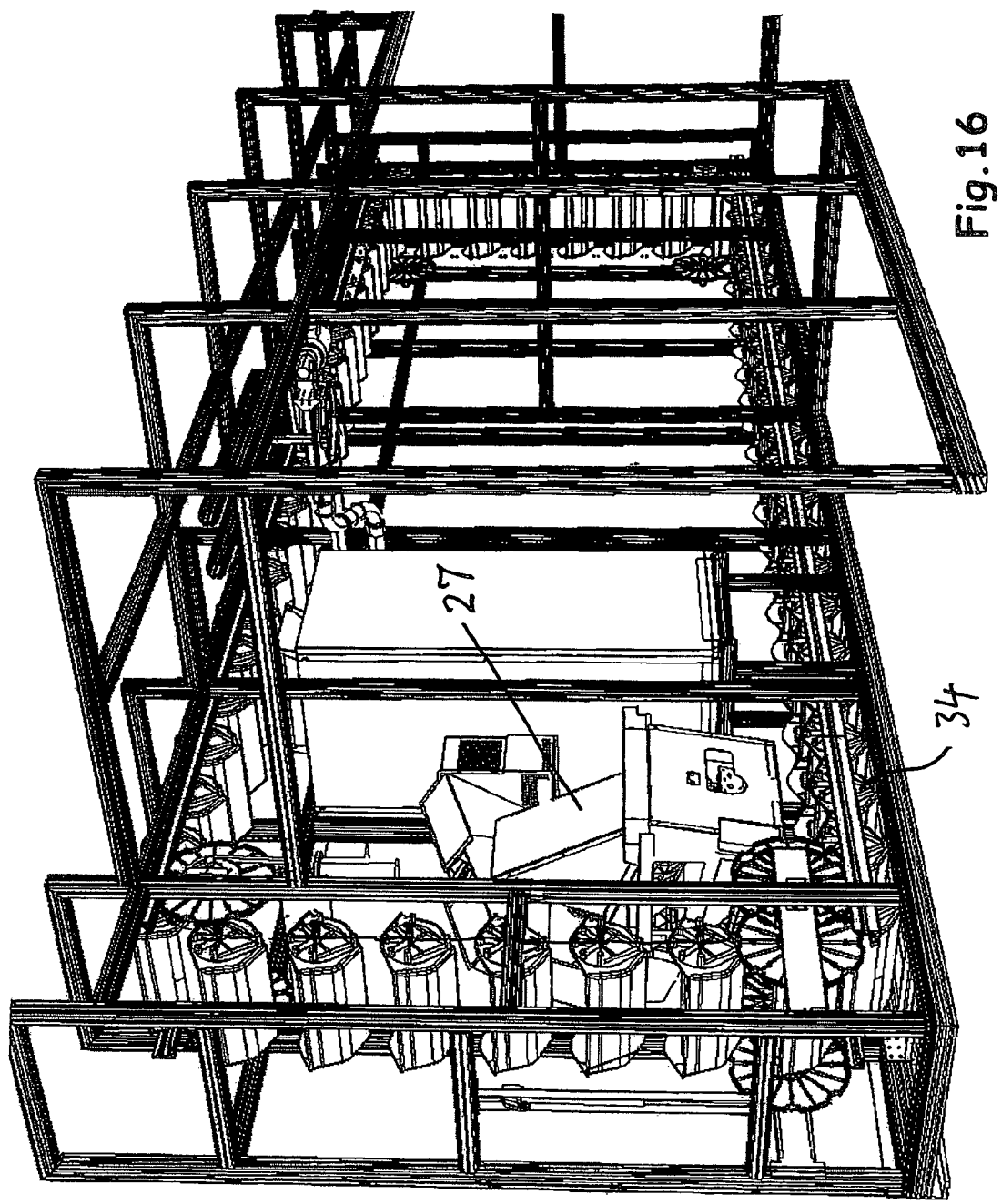
FIG. 16 is a perspective view of that shown in FIG. 15 from the opposite side.

Weight sensors 18-21 are thus incorporated in the drive shaft of each gate and are included, as mentioned earlier, in the connection between control element and the gate parts. Strain gauges that are per se known may be used for torsion measurement. The strain gauges from one pair of gates are read off in a full bridge (Wheatstone bridge) arrangement, where each strain gauge forms a part of the respective half bridge. To summarise, the weight or torsion sensors 18-21 are used for a) detection of articles that are so heavy that they may damage functions downstream, as for example the next pair of gates, subsequent transport in conveyor systems as shown in FIGS. 15 and 16 and processing; b) detection of articles whose mass or weight is unreasonably or disproportionally great in relation to the dimensions and material of the article, which requires that recognition of material and video monitoring are present so that these articles can be sorted into a separate fraction; and c) detection of undesirable jamming situations where downstream movement of articles is prevented because they are stuck in one or both gates.

If an article which is weighed by the sensors 18,19 in the first gate pair 1, 2 is so heavy that the process control unit 24 assesses that the further fall of the article down to the next gate pair 3, 4 could damage this gate pair 3, 4, the gate pair 3, 4 is caused to open fully when the gate pair 1, 2 open so that the article will be able to fall unobstructed through the gate 3, 4 and, for example, either fall straight down into a transport container 34, or—if one or more transport containers have been removed in the row of transport containers—fall down into an open space between pairs of lines or chains that are connected to the containers and which cause movement of the containers 34 in an endless path and to a collecting point. Of course, a guide flap, controllable by the process control unit or a chute (not shown) downstream of the gate pair 3, 4 is also conceivable for selectively guiding an unacceptable article back to a location close to the point at which a person is feeding into or to a collecting point. Whether it is considered necessary to provide shock-absorbing means at the collecting point depends on its physical design.

A study of FIGS. 6-10 will reveal that if, on the basis of the starting position in FIG. 6, actuating element 7 is rotated in the anticlockwise direction (opposite direction to that apparent from the sequence from FIG. 6 to FIG. 10), i.e., that the engaging pin 7" first comes in contact with the control element 6 before it has rotated through such an angle that it comes in contact with the control element 5, this will cause the lowermost gate 3, 4 to be completely open before the uppermost gate 1, 2 begins to open. In this case, it will be understood that the opening sequence for the gates 1, 2 and 3, 4 will be the opposite of that shown in FIGS. 6-10.

If a person feeds into the holding area defined by the gate pair 1, 2 an article which is unacceptably heavy, it is of course also possible that the process control unit 24 will stop the motor 8, whereupon an alarm is triggered and/or that the person is invited to remove the article from this area.

An article's weight or mass is determined on the basis of the torsion that the sensors 18-21 detect on the shafts of the gate parts. However, as the contact point of the articles on the two parts of the gate may vary substantially as a function of the size and position of the articles, the arm length from the centre of gravity of the article to the torsion sensor in question will vary. To increase accuracy of the reading, said camera 33 and video processing in the unit 24 are advantageously used to determine the shape of the article and its position in the chamber, so that the torque arm determined by the article's position can be better estimated and incorporated as a correcting factor in the calculation of the weight or mass of the article.

FIGS. 15 and 16 show a reverse vending machine in which the device according to the invention is incorporated. The device is adapted to be able, on control from the unit 24, to cause articles to be discharged from the second gate in the device at a correct time in order to then fall down into a

The invention claimed is:

1. A device for moving articles (9) between positions at time intervals, comprising at least two gates (1, 2; 3, 4) disposed sequentially in the direction of travel of the article which can controllably be opened and closed, a temporary holding area for the article (9), being formed upstream of each gate (10; 11),
    wherein the two gates (1, 2; 3, 4) are controllable by means of one single drive motor or actuator (8);
    wherein the two gates (1, 2; 3, 4) are each associated with one control element (5; 6) that is rotatable about a respective axis of rotation;
    wherein the drive motor or the actuator (8) is adapted to move one actuating element (7) that is rotatable about an axis of rotation,
    wherein said one actuating element (7) is common to the respective control elements (5; 6) of the two gates;
    wherein each control element (5; 6) has two or three curved recess portions (5', 5", 5'''; 6', 6", 6''') which are angularly offset from each other and where adjacent recess portions are separated by a guide groove (12, 13; 14, 15); and
    wherein the actuating element (7) has a curved portion (7') designed for engagement with a recess portion (5', 5", 5'''; 6', 6", 6''') on at least one of the two control elements, and also has an engaging pin (7') adapted, in certain rotational positions of the actuating element (7), to engage with a guide groove (12, 13; 14, 15) on one of the control elements.

2. A device as disclosed in claim 1, wherein operation of the actuating element (7) in cooperation with the control elements (5; 6) is adapted, when seen in the direction of travel of the article:
    a) to cause a first of the gates (1, 2) to open from the closed state to the open state so as to allow the article to pass through the first gate;
    b) to cause the second, subsequent gate to be kept closed until the article has passed through the first gate and the first gate (1, 2) is closed:
    c) to cause the opening of the second gate (3, 4) so that the article can move through and away from it; and
    d) to cause the closing of the second gate (3, 4) whilst the first gate is still kept closed.

3. A device as disclosed in claim 1, wherein operation of the actuating element (7) in cooperation with the control elements is adapted, when seen in the direction of travel of the article,
    a) to cause the first of the gates (1, 2) to open from the closed state to the open state so as to allow the article to pass through the first gate;
    b) if the extent of the article in the longitudinal direction is greater than the length of the holding area upstream of the second gate, to continue to keep the first gate (1, 2) open whilst the second gate (3, 4) opens; and
    c) after the article has passed through both the first and the second gate (1, 2; 3, 4) and away from the second gate, to close both the first (1, 2) and the second (3, 4) gate.

4. A device as disclosed in claim 1,
    wherein said two or three recess portions ((5', 5", 5'''; 6', 6", 6''') are angularly offset from one another at an angle in the range of 45°-90°.

5. A device as disclosed in claim 1, wherein the curved portion (7') of the actuating element (7) extends across an angular range of 180°-270°.

6. A device as disclosed in claim 1, wherein the actuating element (7) has a circumferential form that is almost identical to a drop.

7. A device as disclosed in claim 1,
    wherein the engaging pin (7') is located at the pointed end of the drop.

8. A device as disclosed in claim 1
    wherein the actuating element (7), in a first rotational direction, is adapted to move from a first rotational position to a second rotational position, and from there on to a third rotational position; and
    wherein the actuating element:
    in the first rotational position, with its curved portion (7'), engages with a first recess portion (5"; 6") on respectively a first and second control element (5; 6) located in the direction of travel of the article, both gates (1, 2; 3, 4) being closed;
    in a second rotational position, with its curved portion (7'), engages with the first recess portion (6") on the second control element (6) and with its engaging pin (7") slidably engages with a first guide groove (12) on the first control element (5), the first guide groove (12) being adjacent to the first recess portion (6") and a second recess portion (5') on the first control element, whereby the first gate (1, 2) is opened whilst the second gate (3, 4) is kept closed; and
    in a third rotational position, with its curved portion (7'), engages with the first recess portion (6") on the second control element (6) and the second recess portion (5') on the first control element (5), the first gate (1, 2) being open and the second gate (3, 4) being closed.

9. A device as disclosed in claim 8,
    wherein the actuating element (7), in a second, opposite rotational direction, is adapted to move from the third rotational position to the second rotational position, whereby the first gate is closed, and
    from the second rotational position to the first rotational position, wherein both gates are closed, and
    wherein the actuating element (7) in the second rotational direction: is adapted to move from the first rotational position to a fourth rotational position, and from there on to a fifth rotational position, wherein the actuating element (7):
    in the fourth rotational position, with its curved portion (7'), engages with the first recess portion (5") on the first control element (5) and with the engaging pin (7") slidably engages with a first guide groove (14) on the second control element (6), the first guide groove (14) being adjacent to the first recess portion (6") and a second recess portion (6') on the second control element, whereby the second gate (3, 4) is opened whilst the first gate (1, 2) is kept closed; and
    in the fifth position, with its curved portion (7'), engages with the second recess portion (6') on the second control element (6) and the first recess portion (5") on the first control element (5), the second gate (3, 4) being open and the first gate (1, 2) being closed; and
    wherein the actuating element in the first rotational direction is adapted to move:
    from the fifth rotational position to the fourth rotational position, whereby the second gate (3, 4) is closed, and from the fourth rotational position to the first rotational position, wherein both gates (1, 2; 3, 4) are closed.

10. A device as disclosed in claim 8,
wherein the actuating element, in the first rotational direction, is adapted to move from the third rotational position on to the fourth rotational position, and from there on to a fifth rotational position, the fifth rotational position being the same as the first rotational position, wherein the actuating element (7):
in the fourth rotational position, with its curved portion (7'), engages with the second recess portion (5') on the first control element (5) and with its engaging pin (7") slidably engages with a second guide groove (15) on the second control element (6), the second guide groove (15) being adjacent to the first recess portion (6") and a third recess portion (6''') on the second control element, whereby the first gate (1, 2) is kept open whilst the second gate (3, 4) is caused to open; and
in the fifth rotational position, with its curved portion (7'), engages with the second recess portion (5') on the first control element (5) and the third recess portion (6''') on the second control element (6), both the first gate (1, 2) and the second gate (3, 4) being open; and
wherein the actuating element (7) is adapted, in a second opposite rotational direction, to move successively from the fifth rotational position to the fourth rotational position, from the fourth rotational position to the third rotational position, from the third rotational position to the second rotational position, and from the second rotational position to the first rotational position.

11. A device as disclosed in claim 1,
wherein at least one sensor (18; 19; 33) is adapted to detect whether one article is situated simultaneously in respective holding areas being upstream of respectively the first gate and the second gate; and
wherein said at least one sensor, on such presence of an article, causes further rotation of the actuating element (7) from the third rotational position to the fourth rotational position, and from there on to the fifth rotational position.

12. A device as disclosed in claim 1,
wherein the gate parts of at least one of the gates are via their drive shafts connected to torsion sensors (18, 19; 20, 21) adapted to detect the mass or the weight of an article resting against the gate and/or to detect the passing of a clamping force threshold when an article is situated in the opening between two gate parts which are trying to close the gate.

13. A device as disclosed in claim 12,
wherein the torsion sensors (18, 19; 20, 21), on such presence of an article which obstructs the closing of the gate, is adapted to signal to a processing unit (24) that there is an unduly large clamping force; and
wherein the processing unit (24) is adapted to cause further rotation of the actuating element (7) from the third rotational position to the fourth rotational position and from there on to a fifth rotational position.

14. A device as disclosed in claim 1,
wherein each gate consists of two mutually rotatable parts (1, 2; 3, 4), wherein at least one of these parts is rotatably mounted on a base member (26); and
wherein the control elements (5; 6) for respectively the first gate (1, 2) and the second gate (3, 4) via the linkages (1', 1", 2', 2"; 3', 3", 4', 4") are adapted to actuatably cause rotational movement of at least one gate part of the respective gate for opening or closing the gate.

15. A device as disclosed in claim 1,
wherein each gate (1, 2; 3, 4) is designed to form a chamber or tray; and
wherein the chamber or the tray forms said article holding area (10, 11) of the respective gate (1, 2; 3, 4).

16. A device as disclosed in claim 1,
wherein operation of the actuating element (7) in cooperation with the control elements (5; 6) is, when seen in the direction of travel of the article, adapted to:
a) cause a second (3; 4) of the gates to open from the closed state to the open state so as to allow the article to pass through this gate when the article is released from a first of the gates;
b) cause the first gate (1, 2) to be kept closed until the second gate (3, 4), located downstream, is in a fully open state;
c) cause the opening of the first gate (1, 2) so that the article (9) can move through and away from it and pass on through the open, second gate (3, 4); and
d) cause closing of the first gate (1, 2) and then the second gate (3, 4).

* * * * *